(12) United States Patent  
Ozawa

(10) Patent No.: US 9,261,757 B2  
(45) Date of Patent: Feb. 16, 2016

(54) PROJECTOR AND METHOD FOR CONTROLLING PROJECTOR USING A SLIDABLE LENS SHUTTER

(71) Applicant: SEIKO EPSON CORPORATION, Tokyo (JP)

(72) Inventor: Takashi Ozawa, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 114 days.

(21) Appl. No.: 13/961,999

(22) Filed: Aug. 8, 2013

(65) Prior Publication Data

US 2014/0043590 A1 Feb. 13, 2014

(30) Foreign Application Priority Data

Aug. 9, 2012 (JP) .................. 2012-176775

(51) Int. Cl.  
*G03B 21/20* (2006.01)  
*G03B 21/14* (2006.01)

(52) U.S. Cl.  
CPC ............ *G03B 21/142* (2013.01); *G03B 21/145* (2013.01); *G03B 21/2086* (2013.01)

(58) Field of Classification Search  
CPC ...... G03B 11/043; G03B 11/06; G03B 21/14; H04N 5/2254; H04N 9/3155; H04N 9/3197; H04N 9/3179; G09G 2320/0613; G09G 2320/062

See application file for complete search history.

(56) References Cited

U.S. PATENT DOCUMENTS

| 2002/0171756 | A1* | 11/2002 | Bigler et al. .................. 348/373 |
| 2007/0206163 | A1 | 9/2007 | Kuroda |
| 2009/0109350 | A1* | 4/2009 | Koyama ........................ 348/759 |
| 2010/0302467 | A1* | 12/2010 | Nagaharu .................... 348/759 |

FOREIGN PATENT DOCUMENTS

| JP | 2007-240551 A | 9/2007 |
| JP | 2012-093605 A | 5/2012 |

* cited by examiner

*Primary Examiner* — Sultan Chowdhury  
*Assistant Examiner* — Danell L Owens  
(74) *Attorney, Agent, or Firm* — Maschoff Brennan

(57) ABSTRACT

A projector can not only perform power on/off operation in synchronization with open/close action of a shutter but also provide a screen mute function achieved by the shutter. When the shutter is located in an OFF position and the period timed by a timer is longer than or equal to a predetermined period during the operation of the projector, the projector is powered off. In this process, after the timing operation performed by the timer and notification from a notification unit are terminated, a light source is turned off and the projector is caused to enter a standby state.

7 Claims, 6 Drawing Sheets

PROJECTOR AND METHOD FOR CONTROLLING PROJECTOR USING A SLIDABLE LENS SHUTTER

CROSS-REFERENCE TO RELATED APPLICATION

The entire disclosure of Japanese Patent Application No. 2012-176775, filed Aug. 9, 2012 is expressly incorporated by reference herein.

BACKGROUND

1. Technical Field

The present invention relates to a projector and a method for controlling the projector.

2. Related Art

Some of image projection projectors are provided with a slidable lens shutter capable of blocking a projection lens opening of an enclosure in order to protect the projection lens or temporarily stop image projection by blocking projected light (temporarily stopping image projection is called image mute function). There is, however, a concern that a user forgets to close the lens shutter after use of the projector and carries the projector with the projection lens unprotected.

JP-A-2012-93605 discloses a projector in which the power source of the projector is turned off in synchronization with the closure of a lens shutter. A projector of this type prevents a user from carrying the projector with the lens shutter unintentionally unclosed because closing the lens shutter is immediately followed by turning off the power source.

In the projector described in JP-A-2012-93605, however, the image mute function, which temporarily stops image projection, and the unclosed lens shutter prevention function, which prevents the user from forgetting to close the lens shutter at the time of power off, are not achieved simultaneously. Further, when open/close operation of the lens shutter is configured to synchronize with on/off action of the power source of the projector, accidental open/close operation of the lens shutter is disadvantageously followed by on/off action of the power source of the projector.

SUMMARY

An advantage of some aspects of the invention is to solve at least a part of the problems described above, and some aspects of the invention can be implemented in the form of the following aspects or application examples:

APPLICATION EXAMPLE 1

This application example is directed to a projector including an image projection unit that modulates light emitted from a light source in accordance with image information and projects the modulated light on a projection surface, an enclosure that accommodates the image projection unit, an opening which is provided in the enclosure and through which the projected light from the image projection unit passes, a shutter capable of blocking and unblocking the opening, a shutter position detection unit that detects the position of the shutter, and a control unit that turns off a power source of the projector when the shutter has been held in a predetermined OFF position for a predetermined period based on the detection result from the shutter position detection unit.

According to this application example, the power source of the projector is turned off when the shutter, which is capable of blocking and unblocking the opening, is held in the predetermined OFF position for the predetermined period. Therefore, even when the shutter is accidentally moved to the OFF position, the power-off operation can be canceled by moving the shutter to another position within the predetermined period.

APPLICATION EXAMPLE 2

This application example is directed to the projector described in the above application example, wherein the control unit turns on the power source of the projector when the shutter has been held in a predetermined ON position for a predetermined period based on the detection result from the shutter position detection unit.

According to this application example, the power source of the projector is turned on when the shutter is held in the predetermined ON position for the predetermined period. Therefore, even when the shutter is accidentally moved to the ON position, the power-on operation can be canceled by moving the shutter to another position within the predetermined period.

APPLICATION EXAMPLE 3

This application example is directed to the projector described in the above application example, which further includes a notification unit that notifies the position of the shutter when the shutter is held in the OFF position or the ON position.

According to this application example, when the shutter is held in the OFF or ON position, the notification unit notifies the position of the shutter. Therefore, when a user accidentally moves the shutter to the OFF or ON position, the notification can prompt the user to move the shutter to another position.

APPLICATION EXAMPLE 4

This application example is directed to the projector described in the above application example, wherein the shutter blocks the opening when the shutter is located in a predetermined closed position, and the OFF position is a position to which the shutter is moved with the shutter blocking the opening.

According to this application example, after the shutter is moved to the closed position to block the opening, the power source can be turned off by moving the shutter to the OFF position with the opening kept being blocked.

APPLICATION EXAMPLE 5

This application example is directed to the projector described in the above application example, wherein the shutter unblocks the opening when the shutter is located in a predetermined open position, and the ON position is a position to which the shutter is moved with the shutter unblocking the opening.

According to this application example, after the shutter is moved to the open position to unblock the opening, the power source can be turned on by moving the shutter to the ON position with the opening kept being unblocked.

APPLICATION EXAMPLE 6

This application example is directed to the projector described in the above application example, wherein the control unit activates an image mute state in which the projection performed by the image projection unit is interrupted when the shutter is located in the OFF position or the closed position.

According to this application example, after the shutter is moved to the closed position to activate the image mute state, in which the projection is interrupted, the power source can be turned off by moving the shutter to the OFF position with the image mute state maintained.

APPLICATION EXAMPLE 7

This application example is directed to the projector described in the above application example, wherein the control unit changes the luminance of the light from the image projection unit after the power source of the projector is turned on and the shutter has been held in the ON position for a predetermined period.

According to this application example, after the power source of the projector is turned on and the shutter is held in the ON position for the predetermined period, the luminance of the light from the image projection unit can be changed. Therefore, the change in the luminance after the power source is turned on can be made only by operating the shutter without any cumbersome menu operation.

APPLICATION EXAMPLE 8

This application example is directed to a method for controlling a projector including an image projection unit that modulates light emitted from a light source in accordance with image information and projects the modulated light on a projection surface, an opening through which the projected light from the image projection unit passes, and a shutter capable of blocking and unblocking the opening. The method includes detecting the position of the shutter, and turning off a power source of the projector when it is detected in the detecting of the position of the shutter that the shutter is held in a predetermined OFF position for a predetermined period.

According to this application example, the power source of the projector is turned off when the shutter, which is capable of blocking and unblocking the opening, is held in the predetermined OFF position for the predetermined period. Therefore, even when the shutter is accidentally moved to the OFF position, the power-off operation can be canceled by moving the shutter to another position within the predetermined period.

BRIEF DESCRIPTION OF THE DRAWINGS

The invention will be described with reference to the accompanying drawings, wherein like numbers reference like elements.

FIG. 1A shows a state in which a shutter is open; and FIG. 1B shows a state in which the shutter is closed.

DESCRIPTION OF EXEMPLARY EMBODIMENTS

Embodiments of the invention will be described below with reference to the drawings. It is noted that the following embodiment does not limit the invention set forth in the claims and all combinations of the features described in the embodiment are not necessarily essential for the aspects of the invention.

First Embodiment

Figure 1A:
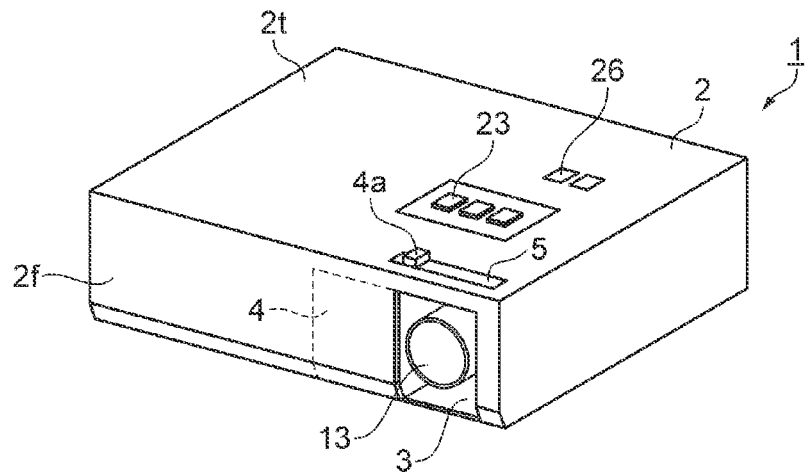
FIGS. 1A and 1B are perspective views of a projector.
Figure 1B:
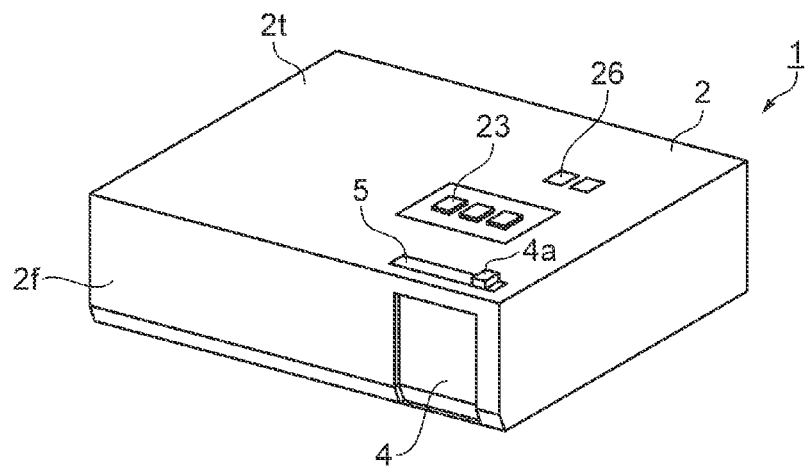

FIGS. 1A and 1B are perspective views of a projector 1 according to the present embodiment. FIG. 1A shows a state in which a shutter 4 is located in an open position, and FIG. 1B shows a state in which the shutter 4 is located in a closed position. The projector 1 has a configuration in which a projector body is covered with an enclosure 2 having an upper surface 2*t*, a front surface 2*f*, and other surfaces, as shown in FIGS. 1A and 1B. The present embodiment will be described on the assumption that the direction toward the front surface 2*f* with respect to the projector 1 or the direction in which image projection is performed is a forward direction.

An input operation unit 23, which includes a plurality of operation keys through which a user performs input operation, is provided on the upper surface 2*t* of the enclosure 2, and a notification unit 26, which notifies the action state of the projector 1, is provided in a position in the vicinity of the input operation unit 23.

An opening 3 is formed in the front surface 2*f* of the enclosure 2, and a projection lens 13, which projects image light (projected light) forward, is provided behind the opening 3. That is, the projected light passes through the opening 3 and is projected on a projection surface.

A shutter 4 is provided as a cover member at the opening 3, and the shutter 4 can be opened and closed. When the shutter 4 blocks the opening 3, the projection lens 13 can be protected and the projected light can be blocked.

The shutter 4 is a substantially rectangular, plate-shaped member made, for example, of a synthetic resin, and an operation knob 4*a*, which allows the user to open and close the shutter 4, is provided at one corner of the rectangular shutter 4 and integrated thereto (see FIGS. 3A to 3D).

The operation knob 4*a* is exposed through a slit 5 formed through the upper surface 2*t* of the enclosure 2, and the shutter 4 can be opened or closed by operating the operation knob 4*a* to cause it to slide rightward or leftward along the slit 5. The operation knob 4*a* protrudes upward beyond the upper surface 2*t* of the enclosure 2, which allows the user to readily perform the slide operation.

When the shutter 4 is located in the open position, the shutter 4 unblocks the opening 3 and the projection lens 13 is exposed, as shown in FIG. 1A. On the other hand, when the shutter 4 is located in the closed position, the shutter 4 blocks the opening 3, as shown in FIG. 1B.

Further, a shutter position detection unit 25 (see FIG. 4), which is formed, for example, of photometric sensors (not shown) and detects the position of the shutter 4, is disposed inside the enclosure 2 in a portion adjacent to the shutter 4. The shutter position detection unit 25 can determine which of the following positions the shutter 4 is located in: an ON position; an open position; a closed position; and an OFF position.

Figure 2:
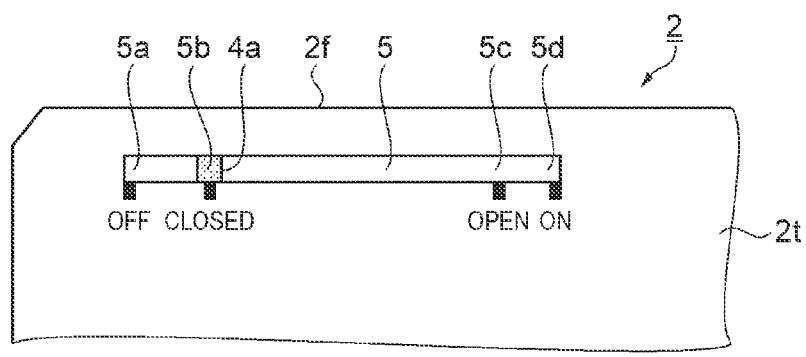
FIG. 2 is an enlarged view of a slit of the projector and portions around the slit.

FIG. 2 is an enlarged view of the slit 5 located in the upper surface 2*t* of the projector 1 and portions around the slit 5 viewed from above. FIGS. 3A to 3D are enlarged views of the opening 3 of the projector 1 and portions around the opening 3 viewed from the front. FIGS. 3A to 3D show open/closed states of the shutter 4.

The slit 5 is formed substantially in parallel to the front surface 2f of the enclosure 2, and the shutter 4 is movable between a position where the operation knob 4a comes into contact with the left end (the end on the left side when the user looks forward) 5a of the slit 5 and a position where the operation knob 4a comes into contact with the right end (the end on the right side when the user looks forward) 5d of the slit 5, as shown in FIG. 2.

Figure 3A:
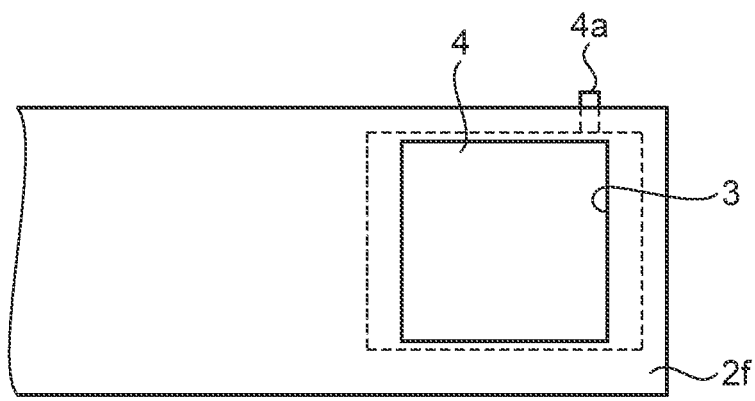
FIGS. 3A to 3D are enlarged views of an opening of the projector and portions around the opening.

When the user operates the operation knob 4a to cause it to slide and moves it to the left end 5a of the slit 5, the shutter 4 blocks the openings 3 and covers the projection lens 13, as shown in FIG. 3A. As a result, the light-exiting side of the projection lens 13 is protected and a light blocking state is achieved.

Figure 3B:
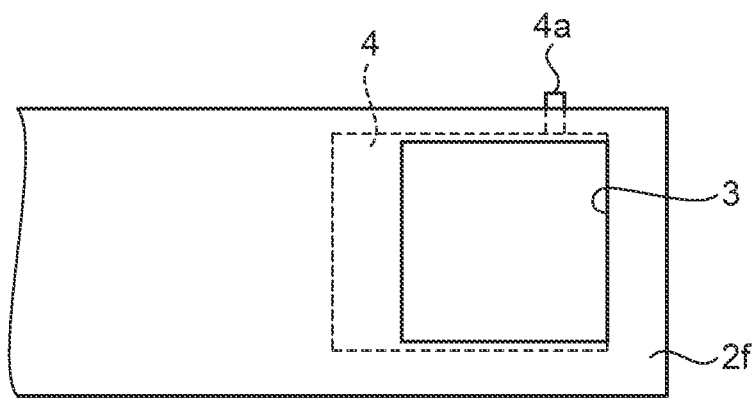
Figure 3C:
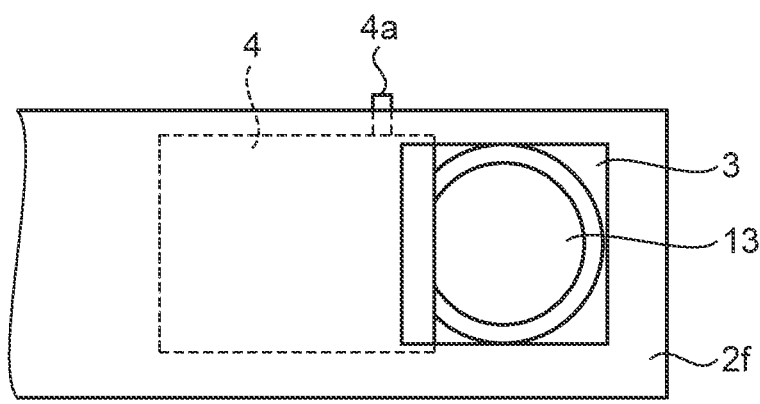
Figure 3D:
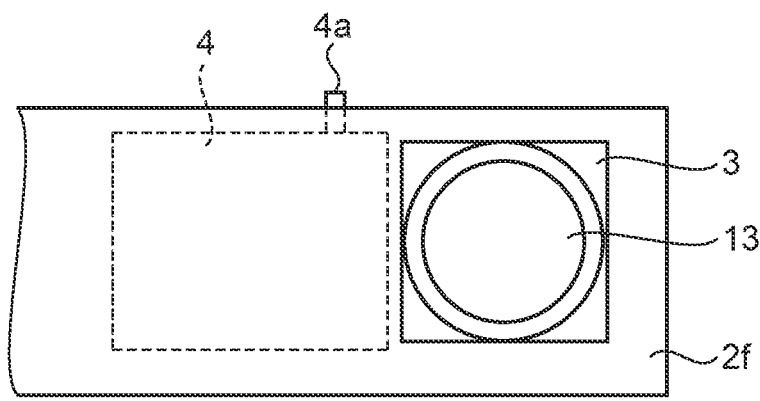

When the user operates the operation knob 4a to cause it to slide and moves it to the right end 5d of the slit 5, the shutter 4 moves away from the forward side of the projection lens 13 (the side where light exits) and unblocks the opening 3, as shown in FIG. 3D. As a result, the projection lens 13 is exposed through the opening 3, and an image light projectable state is achieved.

The slit 5 further has positions 5b and 5c between the left end 5a and the right end 5d.

The position 5b is closer to the left end 5a, and when the user operates the operation knob 4a to cause it to slide and move the shutter 4 to the position 5b of the slit 5 instead of moving the shutter 4 all the way to the left end 5a, the shutter 4 blocks the opening 3 as shown in FIG. 3B, whereby the projection lens 13 is covered and the image light is blocked.

The position 5c is closer to the right end 5d, and when the user operates the operation knob 4a to cause it to slide and move the shutter 4 to the position 5c of the slit 5 instead of moving the shutter 4 all the way to the right end 5d, the shutter 4 unblocks the opening 3, as shown in FIG. 3C.

In the following description, specific positions of the shutter 4 are defined as follows: The position where the shutter 4 is located when the operation knob 4a is moved to the left end 5a of the slit 5 is called the "OFF position;" the position where the shutter 4 is located when the operation knob 4a is moved to the right end 5d of the slit 5 is called the "ON position;" the position where the shutter 4 is located when the operation knob 4a is moved to the position 5c of the slit 5 is called the "open position;" and the position where the shutter 4 is located when the operation knob 4a is moved to the position 5b of the slit 5 is called the "closed position."

Figure 4:
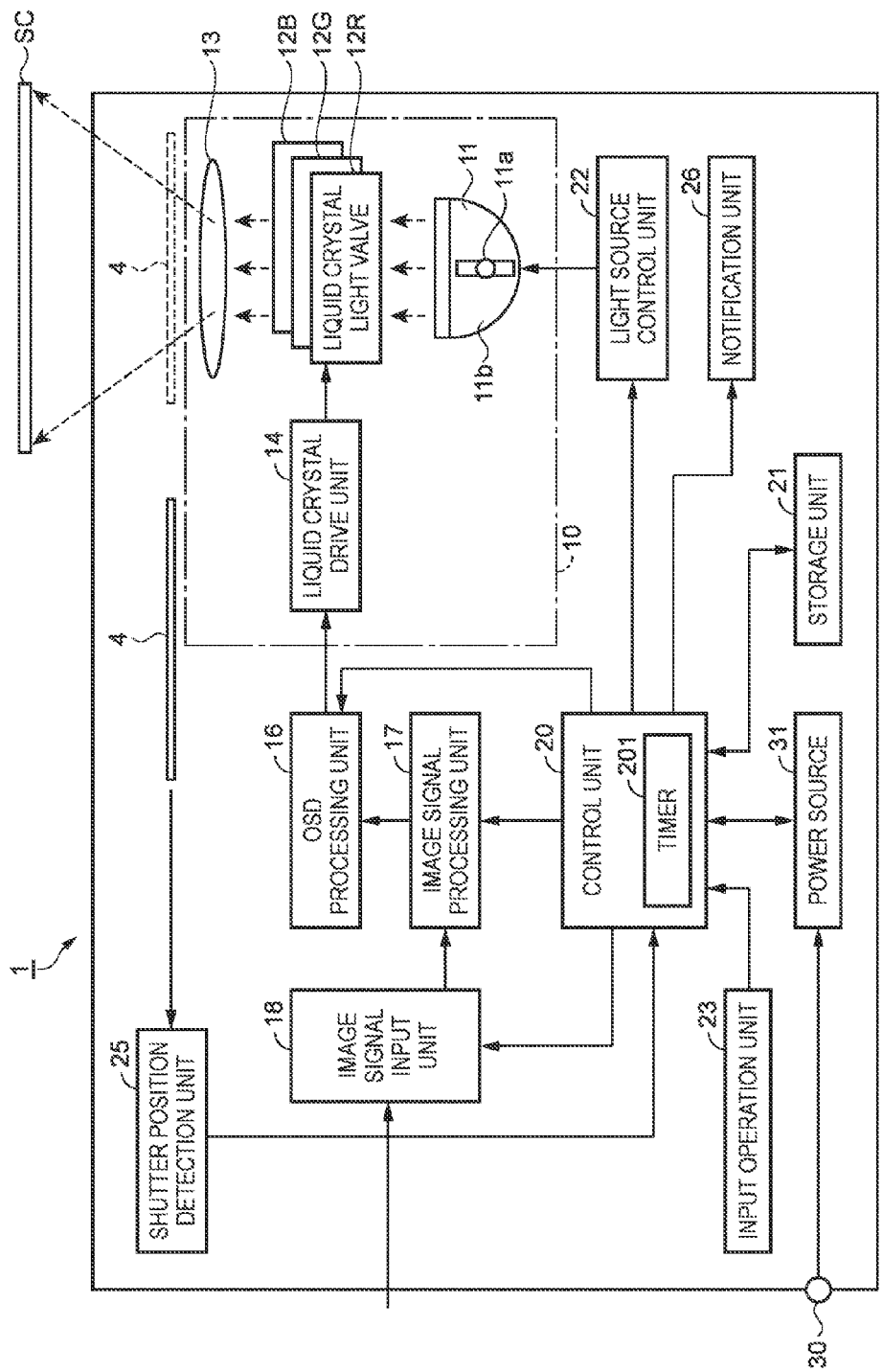
FIG. 4 is a block diagram showing a schematic configuration of the projector.

FIG. 4 is a block diagram showing a schematic configuration of the projector according to the present embodiment.

As shown in FIG. 4, the projector 1 includes an image projection unit 10, an OSD processing unit 16, an image signal processing unit 17, an image signal input unit 18, a control unit 20, a storage unit 21, a light source control unit 22, the input operation unit 23, the shutter position detection unit 25, the notification unit 26, a power source terminal 30, and a power source 31, which are accommodated in the enclosure 2 (FIGS. 1A and 1B) or disposed on the outer surface of the enclosure 2.

The image projection unit 10 includes a light source 11, three liquid crystal light valves 12 (12R, 12G, and 12B) as light modulators, the projection lens 13 as a projection system, and a liquid crystal drive unit 14. The image projection unit 10, in which the liquid crystal light valves 12R, 12G, and 12B modulate light outputted from the light source 11 and the projection lens 13 projects the modulated light, displays an image on a screen SC or any other projection surface.

The light source 11 includes a discharge-type light source lamp 11a, which is formed, for example, of an ultrahigh-pressure mercury lamp or a metal halide lamp, and a reflector 11b, which reflects light emitted from the light source lamp 11a toward the liquid crystal light valves 12R, 12G, and 12B. The light outputted from the light source 11 is converted by an optical integration system (not shown) into light having a substantially uniform luminance distribution, separated into red (R), green (G), and blue (B) color light components, which correspond to the three primary colors of light, by a color separation system (not shown), and then incident on the liquid crystal light valves 12R, 12G, and 12B.

Each of the liquid crystal light valves 12R, 12G, and 12B is formed, for example, of a liquid crystal panel in which a pair of transparent substrates seal a liquid crystal material. Each of the liquid crystal light valves 12R, 12G, and 12B has a plurality of pixels (not shown) arranged in a matrix, and a drive voltage is applicable to the liquid crystal material on a pixel basis.

When the liquid crystal drive unit 14 applies a drive voltage according to inputted image information to each of the pixels, the pixel is so set that it transmits light at a transmittance according to the image information. The light outputted from the light source 11 is therefore modulated when passing through the liquid crystal light valves 12R, 12G, and 12B to form image light according to the image information on a color light basis.

The thus formed color image light fluxes are combined by a light combining system (not shown) on a pixel basis to form color image light, which is enlarged and projected through the projection lens 13 on the screen SC or any other surface.

In the present embodiment, the projector 1 that performs projection by using the light source lamp 11a as a light source is presented by way of example. The invention is also applicable to a projector that performs projection by using an LED (light emitting diode) light source, a laser light source, or any other suitable light source as a light source.

In the present embodiment, the image projection unit 10 has a projection system based on a transmissive liquid crystal-based method using the three liquid crystal light valves 12R, 12G, and 12B as light modulators by way of example. Alternatively, light modulators based on other display methods, such as a reflective liquid crystal-based display method or a micromirror device-based method (light switch-based display method) may be used.

The control unit 20 includes a CPU (central processing unit) and a RAM (random access memory) used to temporarily store, for example, a variety of data (both components are not shown). The control unit 20 acts in accordance with a control program (not shown) stored in the storage unit 21 to oversee and control the action of the projector 1. That is, the control unit 20 along with the storage unit 21 functions as a computer. The control unit 20 further includes a timer 201, which times a period.

The storage unit 21 is formed of a flash memory, an FeRAM (ferroelectric RAM), or any other rewriteable non-volatile memory (not shown). The storage unit 21 stores, for example, the control program for controlling the action of the projector 1 and a variety of setting data that specify action conditions and other parameters of the projector 1.

The input operation unit 23 includes a plurality of operation keys that allow the user to issue a variety of instructions to the projector 1.

The operation keys provided on the input operation unit 23 include a power key for alternately switching the state of the power source between ON and OFF, an input switch key for selecting one of a plurality of image input terminals through which image information is inputted to the image signal input unit 18, a menu key for superimposing a setting menu for making a variety of settings and displaying the superimposed setting menu, a cursor key that allows the user to select a setting item from the menu, a return key, an escape key, and a help key.

When the user operates any of the variety of operation keys on the input operation unit 23, the input operation unit 23 outputs a control signal according to the user operation to the control unit 20. The input operation unit 23 may alternatively be formed of a remote control signal reception unit (not shown) and a remote control (not shown) that allows remote operation. In this case, the remote control transmits an operation signal according to the user operation and carried by infrared light or any other carrier, and the remote control signal reception unit receives the operation signal and forwards it as control information to the control unit 20.

The image signal input unit 18 has a plurality of image input terminals, as described above, to which image information is inputted from an external image output apparatus, such as a video reproduction apparatus and a personal computer, via a cable, a communication apparatus, or any other component (not shown). The inputted image information is outputted to the image signal processing unit 17 in accordance with an instruction from the control unit 20.

The image signal processing unit 17 converts the image information inputted from the image signal input unit 18 into image information representing the grayscale of each of the pixels in the liquid crystal light valves 12R, 12G, and 12B. The converted image information, which is formed of image information for each of the colors, red (R), green (G), and blue (B), contains a plurality of pixel values corresponding to the pixels in each of the liquid crystal light valves 12R, 12G, and 12B. Each of the pixel values determines light transmittance of the corresponding pixel and hence specifies the intensity (grayscale) of light that passes through and exits out of the pixel.

The OSD processing unit 16 superposes a menu image, a message image, and other OSD (on-screen display) images on a projected image and displays the superimposed image in accordance with an instruction from the control unit 20. The OSD processing unit 16 includes an OSD memory (not shown) that stores OSD image information representing figures, fonts, and other information for forming OSD images.

When the control unit 20 instructs superimposition and display of an OSD image, the OSD processing unit 16 reads necessary OSD image information from the OSD memory and combines the OSD image information with the image information inputted from the image signal processing unit 17 in such a way that an OSD image is superimposed on a projected image in a predetermined position. The image information combined with the OSD image information is outputted to the liquid crystal drive unit 14. When the control unit 20 instructs no superposition of an OSD image, the OSD processing unit 16 outputs the image information inputted from the image signal processing unit 17 directly to the liquid crystal drive unit 14. In addition to the control operation described above, the control unit 20 performs power on/off control, which will be described later.

When the liquid crystal drive unit 14 drives the liquid crystal light valves 12R, 12G, and 12B in accordance with the image information inputted from the OSD processing unit 16, the liquid crystal light valves 12R, 12G, and 12B form images according to the image information, and the images are projected through the projection lens 13.

The light source control unit 22 controls supplying electric power to the light source 11 and stopping the electric power supply in accordance with an instruction from the control unit 20 to switch the state of the light source 11 between a light-on state and a light-off state. The light source control unit 22 further has a function of adjusting the luminance of the light from the light source 11 to multiple values.

The shutter position detection unit 25 is formed, for example, of a plurality of photometric sensors or mechanical switches (not shown). The shutter position detection unit 25 detects which of the following positions the shutter 4 has been moved to by sliding operation of the operation knob 4a: the ON position; the open position; the closed position; and the OFF position and outputs the detection result to the control unit 20.

The notification unit 26 is formed, for example, of an LED or a buzzer and notifies the user of the action state of the projector 1 in accordance with an instruction from the control unit 20. Examples of the action state of the projector 1 notified by the notification unit 26 are as follows: the state of the power source, that is, whether the power source has been turned on or off and whether the power source is malfunctioning; the image mute state; and the state of the shutter 4, that is, whether the shutter 4 is held in the ON position or the OFF position.

AC 100 V or any other type of electric power is externally supplied to the power source 31 via the power source terminal 30. The power source 31 converts, for example, commercial electric power (AC power) into DC electric power of a predetermined voltage and supplies the components in the projector 1 with the DC electric power. The power source 31 can switch its state in accordance with an instruction from the control unit 20 between a state in which the power source 31 supplies the components in the projector 1 with electric power necessary for image projection (operating power) (power-on state) and a state in which the power source 31 stops supplying the operating power and waits for operation of powering the projector 1 on (standby state).

In the thus configured projector 1 according to the present embodiment, when a power source cable (not shown) is connected to the power source terminal 30 and electric power is supplied to the power source 31, the power source 31 supplies at least the control unit 20, the storage unit 21, and the input operation unit 23 with electric power (standby power), and the control unit 20 receives the supplied electric power and starts operating in accordance with the control program.

Immediately after the electric power is supplied, the projector 1 operates in the standby state (also referred to as "power-off state") and keeps operating in a state in which the light source 11 does not emit light. When the user operates the power key provided on the input operation unit 23, the control unit 20 instructs the power source 31 to start supplying the components in the projector 1 with the operating power so that the projector 1 enters the power-on state.

Figure 5:
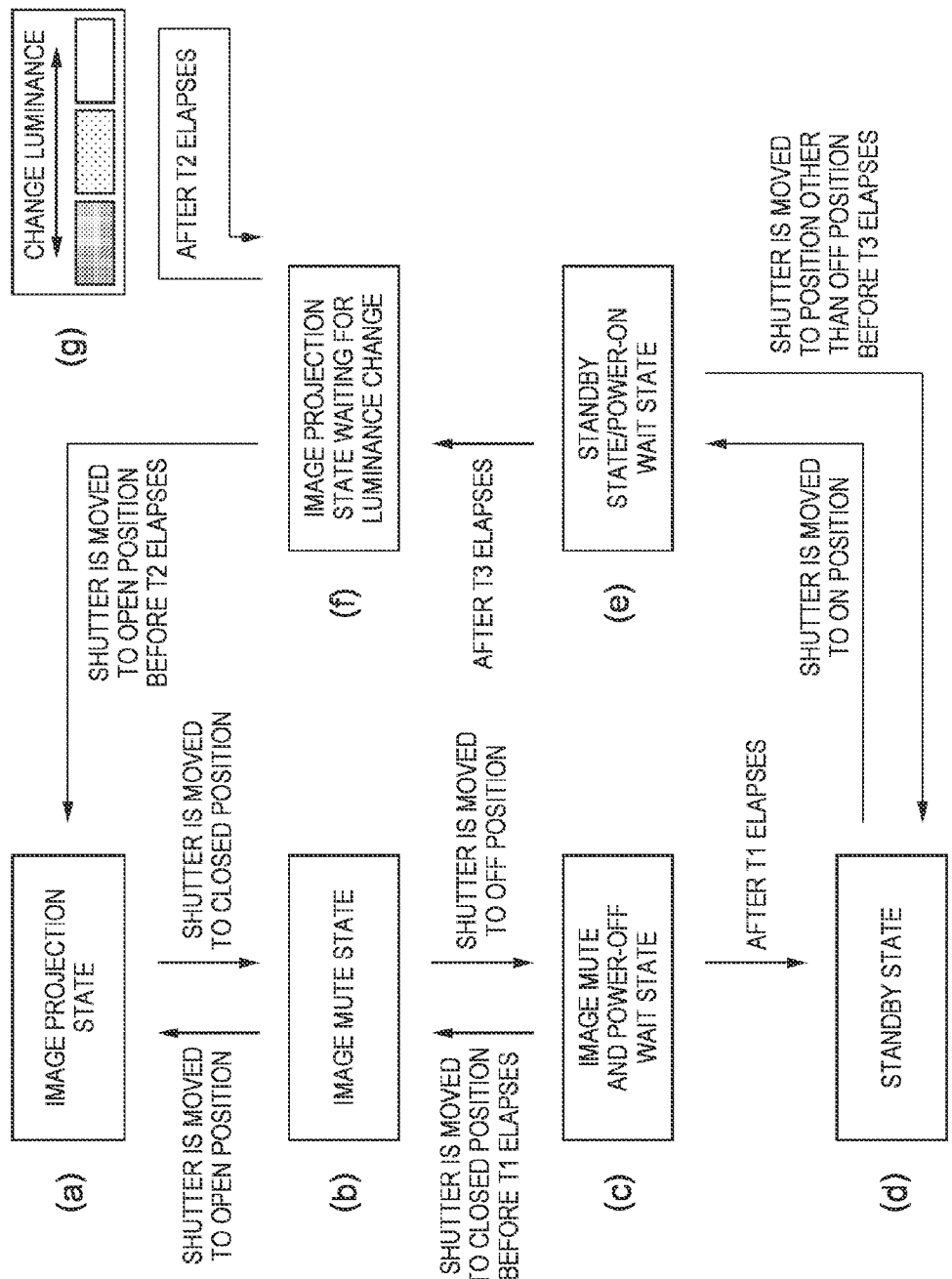
FIG. 5 shows the transition of the shutter position and the action state of the projector.

The transition of the position of the shutter 4 and the action state of the projector 1 according to the present embodiment will next be described with reference to FIG. 5.

A state (a) shows that the projector 1 is in operation and the shutter 4 is located in the open position for image projection.

A state (b) shows that the state (a) transitions to a state in which the shutter 4 has been moved to the closed position. In this state, in which the shutter 4 blocks the opening 3, the projected light is blocked and the image mute state is activated. When the state (b) transitions to a state in which the shutter 4 has been moved to the open position, which is the state (a), image projection is resumed.

A state (c) shows that the state (b) transitions to a state in which the shutter 4 has been moved to the OFF position. In this state, the image mute state, in which the shutter 4 blocks the opening 3, is maintained, and the projector 1 waits for power-off operation.

A state (d) shows that a predetermined period T1 (one second, for example) has elapsed with the shutter 4 held in the OFF position as in the state (c). At this point, the projector 1 is powered off and enters the standby state. When the shutter 4 is moved to the closed position before the predetermined period T1 elapses since the state (c), the state transitions to the state (b).

A state (e) shows that the shutter 4 has been moved to the ON position with the projector 1 operating in the standby state as in the state (d). At this point, the projector 1 is not powered on or projects no image and waits for power-on operation.

A state (f) shows that a predetermined period T3 (one second, for example) has elapsed with the shutter 4 held in the ON position as in the state (e). At this point, the projector 1 is powered on and starts image projection.

When the shutter 4 is moved to the open position before a predetermined period T2 (half a second, for example) elapses since the state (f), the state transitions to the state (a). The state (f) is also a state in which the projector 1 waits for operation of changing the luminance of the light from the image projection unit 10.

A state (g) shows that after the projector 1 is powered on, the predetermined period T2 (half a second, for example) has elapsed with the shutter 4 held in the ON position as in the state (f). At this point, the luminance of the light from the image projection unit 10 is incremented or decremented by a predetermined step, and the projector 1 transitions to the state (f) again.

Figure 6:
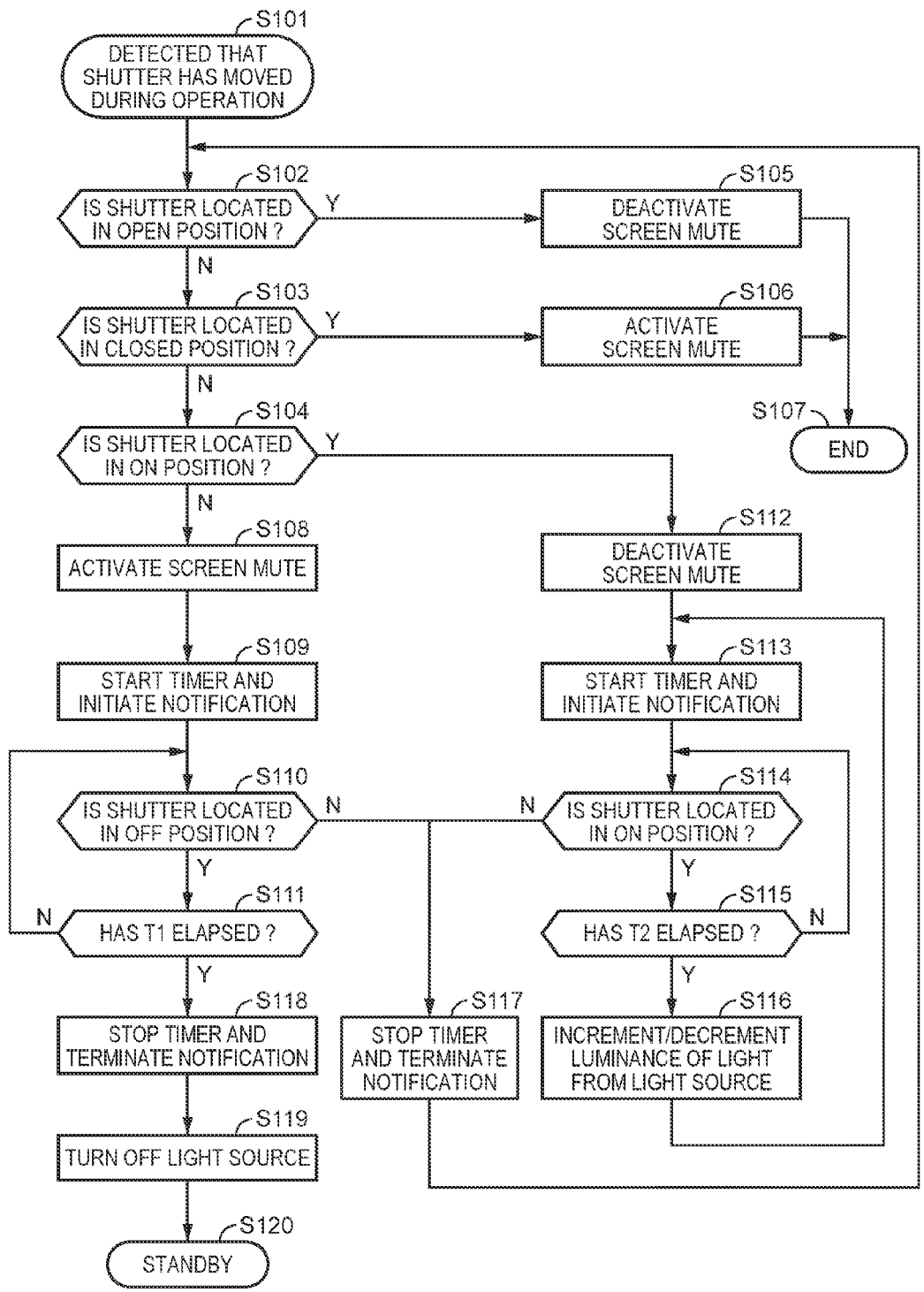
FIG. 6 is a flowchart showing the action of the projector performed when the projector is in operation and it is detected that the shutter has been moved.
Figure 7:
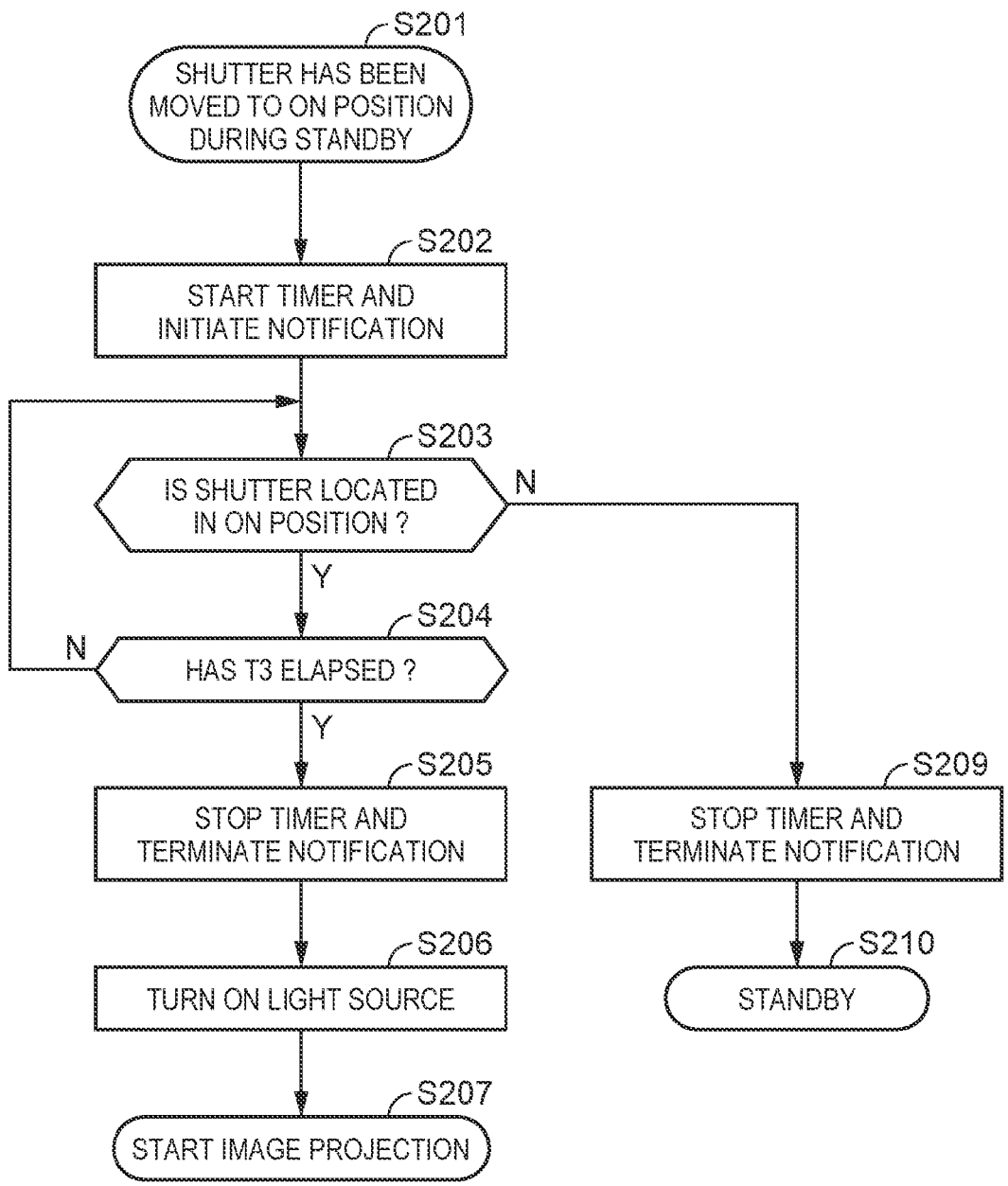
FIG. 7 is a flowchart showing the action of the projector performed when the projector is on standby and it is detected that the shutter has been moved to an ON position.

The action of the projector 1 according to the present embodiment will next be described with reference to the flowcharts shown in FIGS. 6 and 7. FIG. 6 is a flowchart showing the action of the projector 1 performed when it is detected that the shutter 4 has been moved when the projector 1 is in operation, and FIG. 7 is a flowchart showing the action of the projector 1 performed when it is detected that the shutter 4 has been moved to the ON position when the projector 1 is on standby. In the present embodiment, it is assumed that the shutter 4 is set in one of the ON position, the open position, the closed position, and the OFF position.

When it is Detected that the Shutter 4 has been Moved During Operation

When the projector 1 is in operation and it is detected that the shutter 4 has been moved to another position (step S101), the control proceeds to step S102, as shown in FIG. 6.

In step S102, the control unit 20 checks whether or not the shutter 4 is located in the open position. When the shutter 4 is located in the open position (step S102: Y), the control proceeds to step S105. When the shutter 4 is not located in the open position (step S102: N), the control proceeds to step S103.

In step S103, the control unit 20 checks whether or not the shutter 4 is located in the closed position. When the shutter 4 is located in the closed position (step S103: Y), the control proceeds to step S106. When the shutter 4 is not located in the closed position (step S103: N), the control proceeds to step S104.

In step S104, the control unit 20 checks whether or not the shutter 4 is located in the ON position. When the shutter 4 is located in the ON position (step S104: Y), the control proceeds to step S112. When the shutter 4 is not located in the ON position (that is, when the shutter 4 is located in the OFF position) (step S104: N), the control proceeds to step S108. It is noted that steps S101 to S104 correspond to a shutter position detection step.

In step S105, the control unit 20 deactivates the image mute state (screen mute) of the projector 1 to restart image projection, and the control proceeds to step S107.

In step S106, the control unit 20 activates the image mute state of the projector 1 to stop image projection, and the control proceeds to step S107.

In step S107, the action procedure is terminated.

In step S108, the control unit 20 activates the image mute state of the projector 1 to stop image projection, and the control proceeds to step S109.

In step S109, the control unit 20 instructs the timer 201 to start timing and instructs the notification unit 26 to notify that the shutter 4 is held in the OFF position, and the control proceeds to step S110.

In step S110, the control unit 20 checks whether or not the shutter 4 is located in the OFF position. When the shutter 4 is located in the OFF position (step S110: Y), the control proceeds to step S111. When the shutter 4 is not located in the OFF position (that is, when the shutter 4 has been moved to another position) (step S110: N), the control proceeds to step S117.

In step S111, the control unit 20 checks whether or not the period timed by the timer 201 is longer than or equal to the predetermined period T1 (one second, for example). When the period timed by the timer 201 is longer than or equal to the predetermined period T1 (step S111: Y), the control proceeds to step S118. When the period timed by the timer 201 is shorter than the predetermined period T1 (step S111: N), the control proceeds to step S110.

In step S112, the control unit 20 deactivates the image mute state of the projector 1 to restart image projection, and the control proceeds to step S113.

In step S113, the control unit 20 instructs the timer 201 to start timing and instructs the notification unit 26 to notify that the shutter 4 is held in the ON position, and the control proceeds to step S114.

In step S114, the control unit 20 checks whether or not the shutter 4 is located in the ON position. When the shutter 4 is located in the ON position (step S114: Y), the control proceeds to step S115. When the shutter 4 is not located in the ON position (that is, when the shutter 4 has been moved to another position) (step S114: N), the control proceeds to step S117.

In step S115, the control unit 20 checks whether or not the period timed by the timer 201 is longer than or equal to the predetermined period T2 (half a second, for example). When the period timed by the timer 201 is longer than or equal to the predetermined period T2 (step S115: Y), the control proceeds to step S116. When the period timed by the timer 201 is shorter than the predetermined period T2 (step S115: N), the control proceeds to step S114.

In step S116, the control unit 20 instructs the light source control unit 22 to increment or decrement the luminance of the light from the light source 11 by a predetermined step, and the control proceeds to step S113. For example, when the luminance of the light from the light source 11 is maximized, the luminance is decremented so that the brightness decreases.

In step S117, the control unit 20 instructs the timer 201 to stop timing and then instructs the notification unit 26 to terminate the notification, and the control proceeds to step S102.

In step S118, the control unit 20 instructs the timer 201 to stop timing and then instructs the notification unit 26 to terminate the notification, and the control proceeds to step S119.

In step S119, the control unit 20 instructs the light source control unit 22 to turn off the light source 11, and the control proceeds to step S120.

In step S120, the control unit 20 powers off the projector 1 so that the projector 1 enters the standby state, and the control unit 20 terminates the action procedure. It is noted that the transition from step S110 through steps S111, S118, and S119 to step S120 corresponds to a control step.

When it is Detected that the Shutter 4 has been Moved to the ON Position During Standby When the projector 1 is on standby and the shutter position detection unit 25 detects that the shutter 4 has been moved to the ON position (step S201), the control proceeds to step S202, as shown in FIG. 7.

In step S202, the control unit 20 instructs the timer 201 to start timing and instructs the notification unit 26 to notify that the shutter 4 is held in the ON position, and the control proceeds to step S203.

In step S203, the control unit 20 checks whether or not the shutter 4 is located (held) in the ON position. When the shutter 4 is located in the ON position (step S203: Y), the control proceeds to step S204. When the shutter 4 is not located in the ON position, that is, when the shutter 4 has been moved to another position (step S203: N), the control proceeds to step S209.

In step S204, the control unit 20 checks whether or not the period timed by the timer 201 is longer than or equal to the predetermined period T3 (one second, for example). When the period timed by the timer 201 is longer than or equal to the predetermined period T3 (step S204: Y), the control proceeds to step S205. When the period timed by the timer 201 is shorter than the predetermined period T3 (step S204: N), the control proceeds to step S203.

In step S205, the control unit 20 instructs the timer 201 to stop timing and then instructs the notification unit 26 to terminate the notification, and the control proceeds to step S206.

In step S206, the control unit 20 instructs the light source control unit 22 to turn on the light source 11, and the control proceeds to step S207.

In step S207, the control unit 20 instructs the image projection unit 10 to project an image based on an image signal inputted from the image signal input unit 18 and terminates the action procedure.

In step S209, the control unit 20 instructs the timer 201 to stop timing and then instructs the notification unit 26 to terminate the notification, and the control proceeds to step S210.

In step S210, the control unit 20 causes the projector 1 to enter the standby state and terminates the action procedure.

As described above, the projector 1 according to the present embodiment is powered off when the shutter 4, which blocks projected light, is held in the OFF position for the predetermined period T1. Therefore, even when the shutter 4 is accidentally moved to the OFF position, the power-off operation can be canceled by moving the shutter 4 to another position before the predetermined period T1 elapses.

Further, the projector 1 is powered on when the shutter 4 is held in the ON position for the predetermined period T3. Therefore, even when the shutter 4 is accidentally moved to the ON position, the power-on operation can be canceled by moving the shutter 4 to another position before the predetermined period T3 elapses.

When the shutter 4 is held in the OFF or ON position, the notification unit 26 notifies the user of the position of the shutter 4. Therefore, when the user accidentally moves the shutter 4 to the OFF or ON position, the notification can prompt the user to move the shutter 4 to another position.

Further, after the shutter 4 is moved to the closed position to block projected light, the power source can be turned off by moving the shutter 4 to the OFF position with the projected light kept being blocked.

Further, after the shutter 4 is moved to the open position to unblock projected light, the power source can be turned on by moving the shutter 4 to the ON position with the projected light kept being unblocked.

Moreover, after the shutter 4 is moved to the closed position to activate the image mute state, in which projection is interrupted, the power source can be turned off by moving the shutter 4 to the OFF position with the image mute state maintained.

Further, after the projector is powered on and the shutter 4 is held in the ON position for the predetermined period T2, the luminance of projected light from the image projection unit 10 can be changed. Therefore, the change in the luminance after the projector 1 is powered on can be made only by operating the shutter 4 without any cumbersome menu operation.

The embodiment described above can be changed as follows.

Variation 1

In the embodiment described above, a spring mechanism may be provided in each of the OFF position (5a) and the ON position (5d) of the slit 5. In this case, when the operation knob 4a is held in the OFF or ON position and then released, the corresponding spring mechanism moves the shutter 4 to the closed position (5b) or the open position (5c). The provision of the spring mechanisms eliminates the need to move the shutter 4 to the closed or open position but allows the user only to hold the shutter 4 in the OFF or ON position and release the operation knob 4a after the user ascertains that the projector 1 has been powered off or on. Further, when the user accidentally moves the shutter 4 to the ON or OFF position despite of user's intention of moving the shutter 4 to the open or closed position, the shutter 4 can be moved to the open or closed position, which is the desired position, by releasing the operation knob 4a.

Variation 2

When the predetermined period T1 has elapsed with the shutter 4 held in the OFF position, the power source is turned off and the projector 1 enters the standby state in the embodiment described above. Alternatively, the projector 1 may be allowed to enter a complete power-off state (a state in which the power source is not turned on even when the shutter 4 is moved from the OFF position to the ON position). In this case, the projector is allowed to enter the standby state by disconnecting the power cable from a power outlet and then connecting the power cable to the power outlet again. Even in this configuration, when the shutter 4 is accidentally moved to the OFF position, the power-off operation can be canceled by moving the shutter 4 to another position within the predetermined period T1, as in the embodiment described above.

What is claimed is:

1. A projector comprising:
    an image projection unit that modulates light emitted from a light source in accordance with image information and projects the modulated light on a projection surface;
    an enclosure that accommodates the image projection unit;
    an opening which is provided in the enclosure and through which the projected light from the image projection unit passes;
    a shutter capable of blocking and unblocking the opening;
    a shutter position detection unit that detects the position of the shutter; and a control unit that turns off a power source of the projector when the shutter has been held in a predetermined OFF position for a predetermined period based on the detection result from the shutter position detection unit, wherein the shutter blocks the opening when the shutter is located in a predetermined closed position, wherein the OFF position is a position to which the shutter is moved with respect to the opening from the predetermined closed position while the shutter continues to block the opening, and wherein the predetermined closed position is a different position than the OFF position and a screen mute process is activated when the shutter is in the predetermined closed position.

2. The projector according to claim 1, wherein the control unit turns on the power source when the shutter has been held in a predetermined ON position for a predetermined period based on the detection result from the shutter position detection unit.

3. The projector according to claim 1, further comprising a notification unit that notifies the position of the shutter when the shutter is held in the OFF position or the ON position.

4. The projector according to claim 2, wherein the shutter unblocks the opening when the shutter is located in a predetermined open position, and the ON position is a position to which the shutter is moved with the shutter unblocking the opening.

5. The projector according to claim 1, wherein the control unit activates an image mute state in which the projection performed by the image projection unit is interrupted when the shutter is located in the OFF position or the closed position.

6. The projector according to claim 2, wherein the control unit changes the luminance of the light from the image projection unit after the power source is turned on and the shutter has been held in the ON position for a predetermined period.

7. A method for controlling a projector including an image projection unit that modulates light emitted from a light source in accordance with image information and projects the modulated light on a projection surface, an opening which is provided in an enclosure that accommodates the image projection unit and through which the projected light from the image projection unit passes, and a shutter capable of blocking and unblocking the opening, the method comprising:

detecting the position of the shutter; and turning off a power source of the projector when it is detected in the detecting of the position of the shutter that the shutter is held in a predetermined OFF position for a predetermined period, wherein the shutter blocks the opening when the shutter is located in a predetermined closed position, and the OFF position is a position to which the shutter is moved with the shutter blocking the opening, and wherein the predetermined closed position is a different position than the OFF position and a screen mute process is activated when the shutter is in the closed position.

* * * * *